Figure 1:
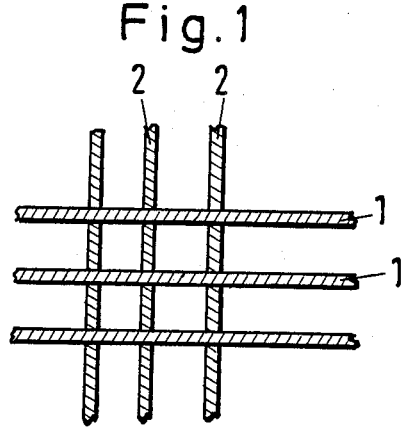

United States Patent [19]

Plöntges et al.

[11] Patent Number: 4,857,379
[45] Date of Patent: Aug. 15, 1989

[54] SHEETLIKE STRUCTURE OF FIBERS, ESPECIALLY AS A REINFORCEMENT FOR PLASTICS COMPONENTS

[75] Inventors: Margret Plöntges, Kempen; Herbert Cox, Geldern, both of Fed. Rep. of Germany

[73] Assignee: Verseidag Industrietextilien GmbH, Fed. Rep. of Germany

[21] Appl. No.: 110,205

[22] Filed: Oct. 19, 1987

[30] Foreign Application Priority Data

Oct. 24, 1986 [DE] Fed. Rep. of Germany ....... 3636300
Apr. 3, 1987 [DE] Fed. Rep. of Germany ....... 3711213

[51] Int. Cl.$^4$ ............................................. B32B 3/06
[52] U.S. Cl. ................................... 428/102; 428/105; 428/113; 428/212; 428/225; 428/229; 428/253; 428/254; 428/257; 428/258; 428/259
[58] Field of Search ............. 428/102, 105, 113, 229, 428/257, 258, 259, 225, 253, 254, 212

[56] References Cited

U.S. PATENT DOCUMENTS

| | | | |
|---|---|---|---|
| 4,113,907 | 9/1978 | Haage et al. | 428/259 |
| 4,467,839 | 8/1984 | Westhead | 428/259 |
| 4,663,223 | 5/1987 | Schweyen | 428/259 |
| 4,668,563 | 5/1987 | Buese et al. | 428/259 |
| 4,761,321 | 8/1988 | McCall et al. | 428/259 |

Primary Examiner—James J. Bell
Attorney, Agent, or Firm—Austin R. Miller

[57] ABSTRACT

A sheetlike structure of fibres is provided, useful as a reinforcement for plastic components. A plurality of threads are arranged in the warp and weft directions, and some of the threads are made of a material which shrinks when subjected to heat treatment at a temperature below its melting point and which substantially regains its original strength after being subjected to heat shrinking and cooling.

9 Claims, 1 Drawing Sheet

SHEETLIKE STRUCTURE OF FIBERS, ESPECIALLY AS A REINFORCEMENT FOR PLASTICS COMPONENTS

The invention relates to a sheetlike structure of fibres, useful as a reinforcement for plastics components, comprising plastics threads lying in the warp and the weft directions.

It is known to use fabrics of polyester threads or mats of glass fibres as reinforcements in molded articles of plastics, as for example boat hulls, surf boards and the like, the reinforcement being laid into a mold, fixed if necessary by an adhesive, and thereafter embedded in plastics material. If the known reinforcements are of reasonable cost, then they have a relatively great weight, or if they are of light weight, then they are very expensive. In each case the known reinforcements are only suited to a limited extent to extreme changes of shape, so that their application is restricted.

The object of the invention is to provide a two-dimensional structure of the kind mentioned at the beginning, in such a way that, with low weight and relatively low manufacturing costs, it is readily deformable and thus can be used in diverse ways as a reinforcement.

This object is substantially achieved by the features of this invention. By the fact that the threads lying in the one direction are more strongly extensible than the threads lying transversely to them, at least during deformation, good deformability of the sheet-like structure is attained, and in the direction of principal stress, high-tenacity and substantially inextensible threads can be employed, which ensure the necessary strength in the reinforcement.

If the sheetlike structure of fibers used as a reinforcement is held taut and then heated by the heating action of a source of heat or by the application of a hot plastics material, so that it shrinks, then because of the fixing of the reinforcement, i.e. of its tautness, tension is applied to the reinforcement which persists in the reinforced plastics component, so that the result is a prestressed reinforcement.

Advantageous embodiments of the invention are explained in the following description and in the further claims.

An exemplary embodiment of the invention will be explained in more detail below with reference to the drawing, in which FIG. 1 shows a plan view of a laid fabric of threads crossing each other.

Figure 2:
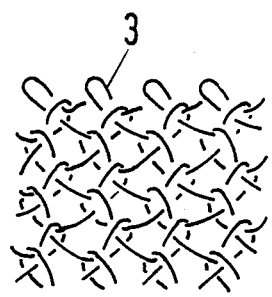
Figure 3:
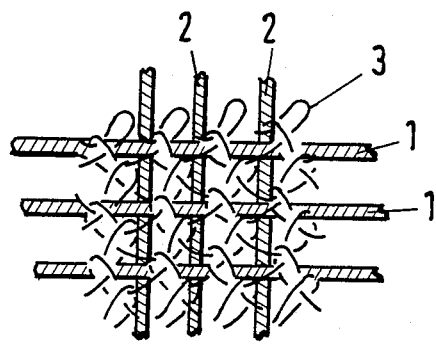

FIG. 2 shows a plan view of a bonding sheet in the form of a knitted fabric, and FIG. 3 shows in a similar view the connection of the bonding chain according to FIG. 2 with the laid fabric of FIG. 1.

Numeral 1 indicates threads or yarns which extend for example in the weft direction, while threads or yarns 2 lying transversely to them extend in the warp direction, as is known in a fabric in which the warp and weft threads are interwoven with each other. In contrast, in the exemplary embodiment shown, the threads 1 form an upper layer and the threads 2 an underlying layer, without the threads that cross each other being interwoven with each other, so that the result is a laid fabric of two superimposed layers of threads or yarns 1 and 2. In each layer the threads lie substantially parallel to one another, while having a predetermined spacing from one another. Advantageously the threads 1 and 2 each consist of a multifilament. The threads 1, 2, which are only laid loosely on top of one another, are held together by a bonding chain 3, which can be made in the form of a knitted fabric. FIGS. 2 and 3 show a closed tricot pattern. This bonding chain is so formed that, during handling of the laid fabric, the threads 1, 2 can easily be displaced relatively to each other. This is achieved by the bonding chain loosely surrounding the cross over points of the threads 1, 2 which cross each other, the threads of the laid fabric being nevertheless held together.

The bonding chain shown in FIG. 2 is introduced into the laid fabric according to FIG. 1 in such a way that the threads 1 and 2 are connected to one another at the crossing points by the bonding chain 3, as is shown in FIG. 3. When this is done, the threads 1 and 2 lying transversely to each other are connected together in such a way that movement of the two threads is possible relatively to one another.

The bonding chain 3 can be knitted or even woven, in such a way that in each case it only bonds together the crossing threads 1 and 2, while the gaps shown in FIG. 1 between the individual threads 1 and 2 remain substantially clear. Preferably the bonding chain 3 is so formed that even in the gaps between the individual threads 1 and 2 there is present a linkage, or stitch, in the bonding chain. In this way, on deformation of the sheet-like structure made in this way, there is achieved a uniform displacement of the less extensible threads 2 per unit area relative to the more extensible threads 1, by the more uniform extension over the area of the knitted structure of the bonding chain 3.

The material of the bonding chain 3 is not important for the strength of the reinforcement; it can for example consist of a polyester yarn which is substantially thinner than the multifilament of the load-bearing threads 1, 2, as is shown schematically in FIG. 3.

For each of the threads 1 and 2 high-tenacity threads or yarns are employed, the threads 1 being more readily deformed or extended on spatial deformation of the fabric, on account of their modulus of elasticity and/or their heat resistance, than are the threads 2 lying transversely to them. The result is a sheetlike structure which is very strong in one direction, and which is movable and readily deformable in the direction lying substantially at right angles to it. If the more readily deformable threads 1 are made of high-tenacity or highly-oriented polyolefin which has a melting point of about 120° C. and hence is substantially less heat-resistant than the polyester material employed for the threads 2 with a melting point of the order of 220° C., then, after deformation under the action of heat, where the temperature is designed so that the polyolefin threads 1 can be readily deformed while the polyester threads 2 lying transversely to them substantially do not extend, and after cooling down, this gives a reinforcement in which even the threads 1 have a high strength, even though they were readily deformable during the deformation. The threads 1 are made of high tenacity polyolefin which, however, is more extensible than polyester under the action of heat at a particular temperature.

From the construction described there results firstly a readily deformable reinforcement which, in conjunction with the plastics material in which it is embedded, results in high strength. Moreover, for the same strength in comparison with a reinforcement of glass fibre mats, a reduction of the weight of the reinforcement by about ⅔ can be attained.

The reinforcement formed in this way has a high absorbtivity for the plastics material applied onto it, in which the reinforcement is embedded. Moreover, for particular uses the application of an adhesive can be omitted, because the threads 1, which soften under the action of heat, provide a good bond with the applied plastics material.

Instead of the laid fabric shown in FIG. 1, it is also possible to provide a fabric in which the threads or yarns 1 and 2 are interwoven with each other in a known manner. With this construction a bonding chain can be omitted, because the threads 1 and 2 are bonded together by the type of weave, but can be displaced relatively to one another.

The crossing threads 1, 2 of the laid fabric consist of a material which is of high tenacity in the cold state with high extension to break, while however the rate :1 of the threads running in the one direction has a lower melting point and softening point than the material of the threads running in the transverse direction. Thus for example the threads 2 consist of polyolefin with a melting point of 163 to 175° C. and a softening point of 150° to 155° C., while the threads 1 consist of polyester with a melting point of 256° C. and a softening point of 230° to 250° C. Because of the lower melting or softening point, the threads 2 begin to shrink under the action of heat below the softening temperature, while the threads 1 do not yet shrink, i.e. they retain their longitudinal dimension. In the cold state, i.e. at ambient temperature, the shrunk threads again have the high strength of the initial state.

By reason of the different shrinking properties, it is possible to achieve shrinking in one direction of the reinforcement, upon treatment of the reinforcement by the action of heat, for example by application of a hot, liquid plastics material, during which the reinforcement fits better to a predetermined shape if the shrinking threads are fixed prior to the heating action, or the reinforcement is secured around the edge. The fixing of the reinforcement can occur by laying the reinforcement into a concave mold or over a convex male mold, whereupon the reinforcement is painted with a liquid plastics material, which thereafter is solidified or cured and thus fixes the threads of the reinforcement. If the reinforcement is laid around a convex mold surface, then it can also be secured at the edges. On laying into a concave mold and securing of the edges of the reinforcement, a molding punch must be employed, which maintains th predetermined shape of the reinforcement during the heating action. With such an arrangement, if the temperature is raised by an external source of heat, for example by heating of the mold or by application of a hot plastics material, to such a level that shrinking of the threads of the reinforcement is triggered off, then because of the fixing of the reinforcement a tension is applied to its threads, which is retained after the termination of the heating action, so that in the finished molded product the reinforcement is in a tensioned state.

The threads can be arranged at a close or wide spacing from one another, in dependence on the particular intended use. The threads 1, 2 can also be arranged in lozenge form, so that they intersect at obtuse and acute angles instead of at right angles. They can also be of different deniers. In place of polyester and polyolefin threads, it is also possible to use other plastics materials in which the material of the one thread shrinks, or shrinks more strongly, under the action of heat, while the material of the thread running transversely to it shrinks not at all, or not so strongly. Preferably high-tenacity plastics threads with high extension to break are employed. High-tenacity plastics threads with small extension to break can also be employed.

The reinforcement can for example be used in conjunction with foam webs. Thus the reinforcement can be applied to an existing foam mat, and be wetted with a two-component polyurethane foam adhesive, which hardens on the surface, whereupon the product thus made is formed under the action of heat, while the foam adhesive layer fully reacts. Likewise it is possible to lay the reinforcement on a foam mat, and to wet it with polyurethane foam, which is then foamed, while a further textile fabric can be applied as a covering and bonded to the structure. The reinforcement in conjunction with foam webs are especially suitable for interior lining components of motor vehicles.

In the use of the reinforcement, a plurality of reinforcements can also be employed superimposed on one another, while, according to the desired rigidity of the end product, the more strongly shrinking threads of each reinforcement can run in the same direction or, alternatively, can be arranged transversely to one another. It is also possible to construct the reinforcement with the same thread material being used in the warp and weft direction, so that, under the action of heat, shrinking or the creation of tension occurs in both the directions lying at right angles to one another.

A reinforcement according to the invention can find employment in the most varied fields. Thus it is not only suitable as reinforcement for plastics components, for example for surf boards, boat hulls, bath tubs and the like, but also for the manufacture of sails, the initially flexible sheetlike structure being consolidated by plastics coating. Moreover there is the possibility of making sails which can be deep drawn by action of heat, for example for surf boards. The plastics coating of the sheetlike structure can then also take place in the form of applied plastics films.

For tubular or rod-like constructional components, the sheetlike structure in accordance with the invention is preferably made tubular, the high-tenacity inextensible threads 2 extending in the longitudinal direction of the tube if the component is to be loaded in the direction of its length, while the threads 1 which are extensible under deformation conditions run in the transverse direction. The reverse construction is also possible, for example for a tube which is loaded by internal pressure.

The bonding chain 3 can be made in the form of a knitted bonding chain or also in another bonding pattern which permits a relatively great mobility of the threads 1 and 2. FIGS. 2 and 3 show a closed tricot pattern of the bonding chain.

In one exemplary embodiment of the sheet like structure, there are 7.1 threads/cm in the one direction, 3.0 threads/cm in the direction running transversely to it, and 6.0 stitches/cm in the bonding, the weight per unit area being 90–150 g/m$^2$ In this case, for the thread properties given in the following table, the 3.0 threads/cm are made of thread 2 and the 7.1 threads/cm of thread 1.

Instead of polyester or polyolefin threads, other thread materials can also be employed, provided the material of one of the threads is more readily extensible under deforming conditions than that of the threads running transversely to it.

The yarn count can vary from 50 to 3300 dtex according to use.

Below are given preferred values for the threads employed:

|  | Thread 1 | Thread 2 | Bonding chain 3 |
|---|---|---|---|
| Kind of yarn | Polyester Tr. | Polyolefin PP | Polyester Tr. 680 |
| Type of yarn | high-tenacity, 712 | high-tenacity Lp hard | normal strength |
| yarn count dtex | 830 | 380 | 50 |
| number of filaments | 200 | 60 | 20 |
| thread tenacity g/d | 5.5–6.5 | 8.5–9.5 | 3.5–4.3 |
| extension at break % | 16–19 | 24–25 | 7–8 |
| softening point | 230–250° C. | 150–155° C. | 230–250° C. |
| melting point | 256° C. | 163–175° C. | 256° C. |
| density g/cm$^3$ | 1.38 | 0.91 | 1.38 |

The threads 1 can be used for the warp direction and the threads 2 for the weft direction and vice versa.

We claim:

1. A sheetlike structure of fibres comprising: a plurality of threads arranged in directions crossing each other and in intimate contact with a plastic material which they reinforce, wherein at least some of the threads comprise a material which shrinks when subjected to heat treatment at a temperature below its melting point and which substantially regains its original strength upon cooling after being subjected to heat shrinking, whereby at least some of the threads, after heat shrinking, are prestressed in said plastic.

2. The sheetlike structure as in claimed in claim 1, wherein the threads in the one direction consist of a material which has a lower melting point and which, under the action of a predetermined temperature lying below the melting point, shrinks to a predetermined extent, while the threads lying transversely to them consist of a material which has a higher melting point and which, under the action of this temperature, shrink not at all or not so strongly.

3. The sheetlike structure as claim®d in claim 1 wherein the threads are of high tenacity while in the cold state and resume this property after the action of heat and cooling down.

4. The sheetlike structure as claimed in claim 1, wherein the threads are arranged in the form of a laid fabric and are bonded together by a bonding chain in such a way that movement of the threads is possible relatively to one another.

5. The sheetlike structure as claimed in claim 1, wherein the threads are arranged in the form of a woven fabric.

6. The sheetlike structure as defined in claim 1, wherein the threads lying in one of said directions are more extensible during deformation than the threads lying in the other of said directions.

7. The sheetlike structure as defined in claim 1, wherein the material of the plastic threads is capable of taking a tension upon shrinking and tautening of the threads.

8. A pre-stressed reinforced plastic sheet comprising:
a sheetlike structure of fibres having a plurality of high tenacity threads arranged in groups crossing each other
a plastic material impregnated by heat into said sheetlike structure,
at least some of the threads comprising a material which shrinks when subjected to heat at a temperature of impregnation with said plastic material and which substantially regains its original strength upon cooling after said heat shrinking.
said plastic sheet after cooling being pre-stressed and reinforced under tension by the shrunken fibres.

9. The plastic sheet defined in claim 8, wherein the group of threads lying one of said directions is more extensible during deformation than the group of threads lying in the other of said directions.

* * * * *

UNITED STATES PATENT AND TRADEMARK OFFICE
CERTIFICATE OF CORRECTION

PATENT NO. : 4,857,379

DATED : August 15, 1989

INVENTOR(S) : Margret Plontges

It is certified that error appears in the above-identified patent and that said Letters Patent is hereby corrected as shown below:

Claim 1, line 1, after "fibres" insert --combined as a reinforcement for plastic--.

Signed and Sealed this

Third Day of July, 1990

Attest:

*Attesting Officer*

HARRY F. MANBECK, JR.

*Commissioner of Patents and Trademarks*